UNITED STATES PATENT OFFICE.

MAX BUCHNER, OF HANOVER-KLEEFELD, GERMANY.

PROCESS OF FIXING SYNTHETICAL NITRIC ACID.

1,427,441.  Specification of Letters Patent.  Patented Aug. 29, 1922.

No Drawing.  Application filed April 6, 1921. Serial No. 459,205.

*To all whom it may concern:*

Be it known that I, MAX BUCHNER, a subject of the German State, and resident of Hanover-Kleefeld, in the State of Prussia, have invented certain new and useful Improvements in a Process of Fixing Synthetical Nitric Acid (for which I have filed application in Germany, Oct. 18, 1917); and I do hereby declare the following to be a full, clear, and exact description of the invention, such as will enable others skilled in the art to which it pertains to make and use the same.

For producing synthetical nitric acid the artificially produced nitric oxides or synthetical nitric acid are brought together with soda, whereupon the obtained sodium salt is decomposed by means of sulphuric acid. This causes sulphate of sodium to become a by-product.

The invention refers to a process for fixing artificial nitric acid whereby the valuable soda is saved and the formation of by-products is avoided. It combines the recovery of sulphur and the utilization of the sulphate otherwise going to waste in the manufacture of nitric acid.

The feature of novelty consists in that the synthetically obtained nitric acid or the nitric oxides are made to act on sulphides of alkali or of alkali earths.

The liquid nitric acid obtained by oxidation according to new processes from air or ammonia or else immediately the gaseous nitric oxides are made to act according to my invention on the sulphides of alkalies or alkaline earths. In doing so there is obtained on the one hand the required nitre, as $NaNO_3$ from which pure nitric acid may be produced, and on the other hand sulphuretted hydrogen ($H_2S$). The next step is to oxidize this sulphuretted hydrogen into oxides of sulphur, wherefrom in the well known way sulphuric acid can be obtained. This sulphuric acid is then again available for decomposing nitrates. Thus the sulphuric acid, consumed by the nitric-acid process is recovered. Moreover by introducing the sulphides into this process the soda needed hitherto in other processes is economized.

A modification of the invention consists in the utilization of the sulphide of sodium obtained from sulphate of sodium by reducing it with carbon.

The invention presents the highly astonishing fact that when nitric acid acts under manufacturing conditions on sulphides no oxidation of the sulphur takes place. In properly proportioned combinations the nitric acid and the sulphide change over nearly quantitatively. Indeed such a result could not be foreseen. On the contrary and in analogy with previous experiences the suggestion was justified that owing to the oxidizing action of the nitric acid the sulphide would be oxidized simultaneously under formation of sulphate.

In practice the operation takes place in a diluted solution, either by causing the slightly concentrated synthetical nitric acid to act on the sulphides or by causing the nitric oxides from the synthesizing furnace to pass into a thin aqueous slurry or a solution of the sulphides.

Conforming to the purpose it is worked in low temperature or in a cold, while stirring, in order to develop the sulphuretted hydogen quickly. In order to remove this at all events as quickly as possible at the moment of its formation, a partial vacuum should be maintained in the containers wherein the fixation of the nitric acid takes place.

For fixing the nitric acid or nitric oxides any sulphide of alkali as sulphide of sodium, sulphide of potassium, sulphide of ammonium or sulphides of alkali earths are to be employed. Of most importance for the carrying out of the new process are the sulphides of sodium and calcium. In place of the latter, however, sulphide of barium can be made use of.

What is common to all these forms is the recovery of the important metallic compounds from the manufacturing of nitric acid and the recovery of the sulphuric acid required for decomposing the saltpetre.

The best result is obtained when sulphide of sodium is employed.

I claim:

1. Process of fixing synthetic nitric acid, comprising reacting therewith on a sulphide of a metal whose hydroxide is alkaline.

2. Process of fixing synthetic nitric acid, comprising reacting therewith on a sulphide of an alkali metal.

3. Process of fixing synthetic nitric acid, which comprises reacting with such in a gaseous state directly on a sulphide of an alkali metal.

4. Process of fixing synthetic nitric acid, comprising reacting with said acid on an aqueous slurry of a sulphide of a metal whose hydrate is alkaline.

5. Process of fixing synthetic nitric acid, comprising reacting with said acid on an aqueous solution of a sulphide of a metal whose hydrate is alkaline.

6. Process of fixing synthetic nitric acid, which comprises causing synthetic nitrogen-oxygen combinations to react on sulphides of metals whose hydrates are alkaline at a temperature below normal temperature.

7. A process of fixing synthetic nitric acid, which comprises reacting with synthetic nitrogen-oxygen compounds on sulphides of metals whose hydrates are alkaline while agitated.

8. A process of fixing synthetic nitric acid, which comprises reacting with synthetic nitrogen-oxygen compounds on a sulphide of a metal whose hydrate is alkaline under partial vacuum.

9. A process of fixing synthetic nitric acid which comprises causing nitrogen-oxygen furnace reaction products to react on soluble alkaline sulphides thereby forming sulphuretted hydrogen and nitrogen compounds of the alkali, and reacting on the latter with sulphuric acid to form nitric acid and a sulphate.

10. A process of fixing synthetic nitric acid which comprises causing nitrogen-oxygen furnace reaction products to react on soluble alkaline sulphides, thereby forming sulphuretted hydrogen and raw nitrate, reacting on the raw nitrate with sulphuric acid to form sulphate and nitric acid, oxidizing the sulphuretted hydrogen to acid for return into cycle of operation and reducing the sulphate to sulphide for return into the cycle of operations.

In testimony that I claim the foregoing as my invention I have signed my name in presence of two subscribing witnesses.

Dr. MAX BUCHNER.

Witnesses:
BERNHARD SCHWARTZ,
LIONHARD SCHUMACHER.